United States Patent [19]

Uchida

[11] Patent Number: 5,015,215
[45] Date of Patent: May 14, 1991

[54] FLEXIBLE BOOT FOR UNIVERSAL JOINTS

[75] Inventor: Susumu Uchida, Susono, Japan

[73] Assignees: Keeper Co., Ltd., Tokyo; NTN Corporation, Osaka, both of Japan

[21] Appl. No.: 536,953

[22] Filed: Jun. 7, 1990

Related U.S. Application Data

[63] Continuation of Ser. No. 410,008, Sep. 20, 1989, abandoned, which is a continuation of Ser. No. 236,790, Aug. 26, 1988, abandoned.

[30] Foreign Application Priority Data

Aug. 31, 1987 [JP] Japan .................. 62-132726

[51] Int. Cl.⁵ .................................. F16D 3/84
[52] U.S. Cl. ...................... 464/175; 277/212 FB
[58] Field of Search .............. 277/212 FB; 403/50; 464/145, 146, 175, 906

[56] References Cited

U.S. PATENT DOCUMENTS

| | | | |
|---|---|---|---|
| 2,691,876 | 10/1954 | Wildhaber | 464/175 X |
| 2,755,643 | 7/1956 | Wildhaber | 464/175 |
| 3,063,266 | 11/1962 | Rabson | 464/175 X |
| 3,204,427 | 9/1965 | Dunn | 464/175 X |
| 3,982,840 | 9/1976 | Grosseau | 464/906 X |
| 4,642,067 | 2/1987 | Geisthoff et al. | 464/175 |

FOREIGN PATENT DOCUMENTS

| | | |
|---|---|---|
| 2225070 | 5/1974 | Fed. Rep. of Germany . |
| 910766 | 6/1946 | France ................. 464/175 |
| 2471525 | 6/1981 | France . |
| 163452 | 12/1978 | Japan . |
| 20618 | 5/1981 | Japan . |
| 169854 | 10/1982 | Japan . |
| 374298 | 2/1964 | Switzerland . |
| 1336129 | 7/1973 | United Kingdom . |

Primary Examiner—Thomas R. Hannon
Attorney, Agent, or Firm—Wegner, Cantor, Mueller & Player

[57] ABSTRACT

A flexible boot for universal joints including a joint body having an inner ring fixed to one end of a first shaft and an outer ring provided on one end of a second shaft comprises both ends fixed to the outer ring and to the first shaft, respectively, and a bellows portion positioned between the both ends and having at least one valley. There is provided at least one elastic holder ring closely contacted with an outer peripheral surface of the at least one valley to prevent acute folding of the valley of the flexible boot.

5 Claims, 4 Drawing Sheets

FLEXIBLE BOOT FOR UNIVERSAL JOINTS

This application is a continuation of U.S. application Ser. No. 07/410,008 filed Sept. 20, 1989, which is a continuation of U.S. application Ser. No. 07/236,790 filed Aug. 26, 1988 both abandoned.

BACKGROUND OF THE INVENTION

1. Field of the Invention

The present invention relates to a flexible boot for universal joints such as a constant velocity joint used with a drive shaft of an automobile and the like.

2. Description of the Prior Art

A conventional constant velocity joint includes, as shown in FIG. 11, an inner ring 10 fixed to one end of a first shaft 6, an outer ring 5 formed on one end of a second shaft 9, and a flexible boot 1 having a bellows portion 4 and fixed at its both ends to the outer ring 5 and the first shaft, respectively. The flexible boot 1 serves to sealingly hold therein grease used as lubricant for the constant velocity joint and to prevent foreign matter such as dust and water from entering into the joint. The bellows portion 4 of the flexible boot 1 can follow the movement of the joint by expanding and contracting peaks and valleys of the bellows portion 4 even when the first shaft is inclined at a certain operating angle with respect to the second shaft. To this end, the peaks and valleys of the bellows portion are so configurated that they have smoothly curved bent portions for dispersing the stress applied thereon, and the bellows portion 4 is made of material having high elasticity and good resistance to fatigue due to the expansion and contraction thereof, such as rubber and resin.

In the above-mentioned conventional constant velocity joint, however, there was a problem that the valleys 4a of the bellows portion 4 were damaged in a short time when the joint often operated at the large operating angle between the first and second shafts, even if the bellows portion of the flexible boot was made of the material having the good resistance to fatigue due to the expansion and contraction thereof.

More specifically, as shown in FIG. 11, when the constant velocity joint is operated at the large operating angle (i.e., when the first shaft 6 is largely inclined with respect to the second shaft 9 as shown), the valleys 4a of the bellows portion 4 are compressed between an end surface 5a of the outer ring 5 of the second shaft 9 and an outer surface of the first shaft 6, with the result that some of the valleys 4a cannot maintain its smoothly curved configuration, thus creating acutely folded portions B in the valleys 4a. Due to such folded portion B, the condition which exceeds the elastic limit of the material of the bellows is generated in the folded portion (i.e., the condition which changes molecular construction in the material), as in the case where, when a rubber plate is acutely folded, a folded mark is created in the folded portion. When the folded portions B are suddenly expanded due to the change in the operating angle (i.e., the change in the inclination of the first shaft with respect to the second shaft), the molecular construction in the material of the bellows portion will be destroyed. Thus, by repeated folding and expansion of the bellows portion, the valleys of the bellows portion of the conventional flexible boot will be prematurely destroyed. In summary, in the conventional flexible boot, when the valleys of the bellows portion of the flexible boot are acutely folded, the service life of the flexible boot is remarkably or extremely reduced.

SUMMARY OF THE INVENTION

An object of the present invention is to provide a flexible boot for universal joints such as a constant velocity joint which can solve the above-mentioned problem of the conventional flexible boot.

According to the present invention, in order to prevent the acute folding of the valleys of the flexible boot, the flexible boot has at least one elastic holder ring closely or tightly contacted with an outer surface of at least one valley of the flexible boot.

In the present invention, since the flexible boot is provided with the elastic holder ring closely contacted with the outer surface of the valley, even when the flexible boot is operated at the large operating angle, the valley can be smoothly bent along the elastic holder ring. Further, even if the valley of the flexible boot is compressed between the end surface of the outer ring of the second shaft and the surface of the first shaft, since the elastic holder ring is closely contacted with the outer surface of the valley, the valley is smoothly bent around the elastic holder ring, thus preventing the acute folding of the valley of the flexible boot.

DESCRIPTION OF THE PREFERRED EMBODIMENTS

The invention will now be described with reference to the accompanying drawings.

Figure 1:
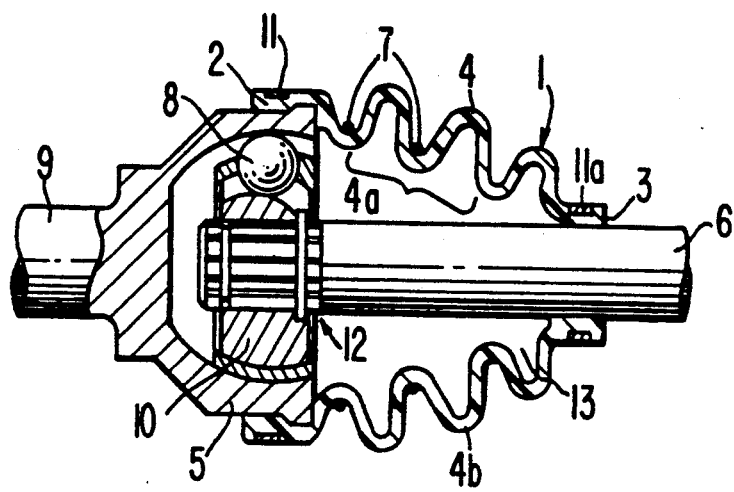
FIG. 1 is a partial sectional view of a constant velocity joint having a flexible boot according to an embodiment of the invention.
Figure 2:
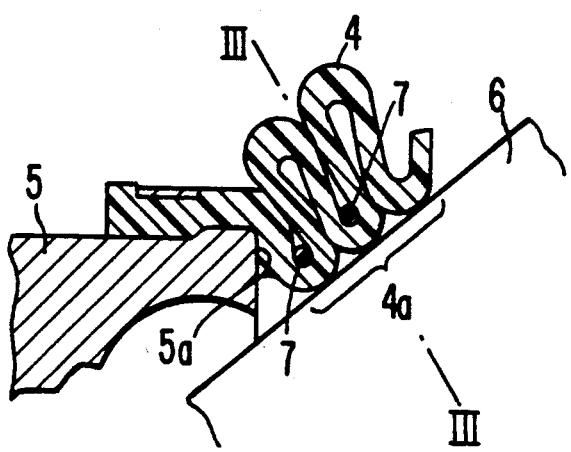
FIG. 2 is a partial sectional view of the constant velocity joint of FIG. 1, showing the joint in a large operating angle.

FIG. 1 is a partial sectional view of a constant velocity joint having a flexible boot according to an embodiment of the invention, and FIG. 2 shows the joint of FIG. 1 wherein the joint is in a large operating angle.

The constant velocity joint includes a joint body 12 having an inner ring 10 fixed to one end of a first shaft 6 and an outer ring 5 provided on one end of a second shaft 9, and a flexible boot 1 having a bellows portion 4 including valleys 4a. The flexible boot 1 has both ends 2 and 3 fixed to the outer ring 5 and the first 6 by means of annular fastening bands 11 and 11a, respectively. Between the inner ring 10 and the outer ring 5, there is arranged a ball 8 for transmitting rotation from one of the shafts to the other. Further, a sealing or closed space 13 for accommodating grease for lubricating the joint body 12 is defined inside the flexible boot 1.

At least one (two in the embodiment shown in FIG. 1) of the valleys 4a of the bellows portion 4 of the flexible boot 1 is provided with a corresponding elastic holder ring 7 closely or tightly contacted with an outer peripheral surface of the valley to prevent acute folding of the valley.

In the condition shown in FIG. 2, the valleys 4a of the bellows portion 4 are compressed between an end surface 5a of the outer ring 5 and the surface of the first shaft 6. However, since the elastic holder rings 7 are closely arranged on the outer peripheral surfaces of the corresponding valleys 4a of the bellows portion, the valleys 4a are smoothly bent around the corresponding elastic holder rings 7.

Figure 3:
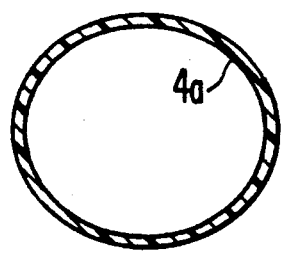
FIG. 3 is a sectional view of the flexible boot taken along the line III—III of FIG. 2.

When the constant velocity joint is in the large operating angle as shown in FIG. 2, the expanded side of the flexible boot 1 (Refer to the side 4b of the bellows in FIG. 1.) is subjected to tensile stress. Thus, in the condition shown in FIG. 2, a cross-sectional configuration of each valley 4a cannot be maintained in true circular shape but presents an oval shape as shown in FIG. 3 which is a sectional view taken along the line III—III of FIG. 2. Accordingly, it is preferable that the stiffness or rigidity to radial deformation of the elastic holder ring 7 is equal to or less than the rigidity to radial deformation of the bellow portion 4, and that an inner diameter of the elastic holder ring 7 is smaller than an outer diameter of the corresponding valley 4a of the bellows portion. With this construction, whatever the sectional configuration of the valley 4a of the bellows is changed, the corresponding elastic holder ring 7 can follow the changed configuration of the valley so that the elastic holder ring is always closely contacted with the outer peripheral surface of the corresponding valley 4a of the bellows portion. Further, since the elastic holder ring 7 closely engages the corresponding valley, there is no relative movement between the elastic holder ring and the corresponding valley; thus, there is no abrasion or wear of the elastic holder ring and the valley of the bellows portion.

Figure 4:
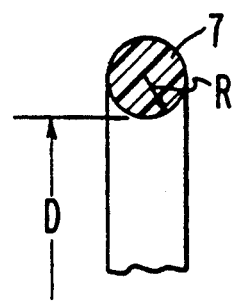
FIGS. 4 to 8 show examples of elastic holder rings applicable to the invention.

Referring to FIG. 4, an example of the elastic holder ring 7 is illustrated in a partial cross-sectional view. It is preferable that elastic holder ring 7 has a smoothly curved inner surface which engages the outer peripheral surface of the corresponding valley 4a of the bellows portion. In FIG. 4, a dimension of a curvature R of the smoothly curved inner surface of the elastic holder ring 7 may vary in accordance with the whole configuration of the bellows portion 4, radius of the valley 4a in free condition, thickness of the valley and the like; however, in general, it has been found that preferable result is achieved when the curvature R is larger than about one half of the thickness of the valley 4a.

The inventor of the present invention manufactured the flexible boot having the elastic holder rings made of the same material as that of the flexible boot and mounted thereon. According to this flexible boot, in the condition that the constant velocity joint is in the position shown in FIG. 1, the dimensions of the flexible boot and the elastic holder rings are as shown in the following table 1:

TABLE 1

| | Flexible Boot | | E.H. Ring | |
| --- | --- | --- | --- | --- |
| | O.D. of Valley | R.C. of Valley | I.D. (D) | (R) |
| Valley & E.H. Ring nearest to O.R 5 | 73.7 mm | 2.8 mm | 73 mm | 1.5 mm |
| Valley & E.H. Ring nearest but one to O.R 5 | 62.6 mm | 2.3 mm | 62 mm | 1.5 mm |

TABLE 1-continued

| | Flexible Boot | | E.H. Ring | |
| --- | --- | --- | --- | --- |
| | O.D. of Valley | R.C. of Valley | I.D. (D) | (R) |

(In the above TABLE 1, "O.D." is outer diameter; "R.C." is radius of curvature; "I.D." is inner diameter; "E.H. Ring" is elastic holder ring; and "O.R." is outer ring)

Comparison test between the constant velocity joint of the invention including the flexible boot having dimensions shown in the table 1 and the conventional constant velocity joint was conducted to examine fatigue life of the valley of each joint. The flexible boot of the conventional joint was made of the same material as that of the joint of the present invention and had the same dimension as shown in the table 1. Further, in the comparison test, the respective joints were operated at a speed of 600 r.p.m. and at the operating angle of 23° to 42°. A cycle of variation of the operating angle was 30 c.p.m.. The result of the comparison test is shown in the following table 2:

TABLE 2

| | Fracture Time | Fractured Portion |
| --- | --- | --- |
| Conventional F.B. | 20 hrs. | Valley nearest to O.R. |
| F.B. having one E.H. Ring on Valley nearest to O.R. | 82 hrs. | Valley nearest but one to O.R. |
| F.B. having two E.H. Rings on Valleys nearest and nearest but one to O.R. | Not fractured up to 200 hrs. (close the test) | None |

(In the TABLE 2, "F.B." is flexible boot; "E.H. Ring" is elastic holder ring; and "O.R." is outer ring)

As seen from the table 2, in the conventional flexible boot, the valley positioned nearest to the outer ring (referred to as "first valley" hereinafter) of the second shaft was fractured in about 20 hours. On the other hand, in the flexible boot of the invention including one elastic holder ring provided on the first valley, the first valley was not fractured in about 82 hours, but the valley positioned nearest but one to the outer ring (referred to as "second valley" hereinafter) was fractured at that time. This means that the fractured portion is shifted from the first valley (having the elastic holder ring) to the second valley (not having the elastic holder ring), and, therefore, that the effect of the invention is noticeable or remarkable. Further, in the flexible boot including two elastic holder rings provided on the first and second valleys, as shown in FIG. 1, none of the valleys were fractured up to 200 hours. This means that the service life of the flexible boot of FIG. 1 will be longer than that of the conventional flexible boot by ten times or more.

FIGS. 5 to 8 are partial sectional views of other examples of the elastic holder rings 7.

Figure 5:

In FIG. 5, the elastic holder ring is preferably made of the same material as that of the flexible boot.

Figure 6:

The elastic holder ring shown in FIG. 6 comprises a closely contacted metallic coil spring formed in a ring-shaped as garter spring used for oil seal. Although the material of this elastic holder ring is harder than that of the flexible boot, since this ring comprises the closely contacted coil spring, it is possible to make the rigidity (of the ring) to the radial deformation equal to or smaller than that of the bellows of the flexible boot. Further, in this elastic holder ring, since an inner surface which will be contacted with the outer peripheral surface of the corresponding valley has a smoothly curved or round surface, the technical effect similar to that of FIG. 4 can be achieved.

Figure 7:
Figure 8:

The elastic holder rings shown in FIGS. 7 and 8 have annular and U-shaped cross-sections, respectively, to reduce the rigidity of the elastic holder rings.

Figure 9:
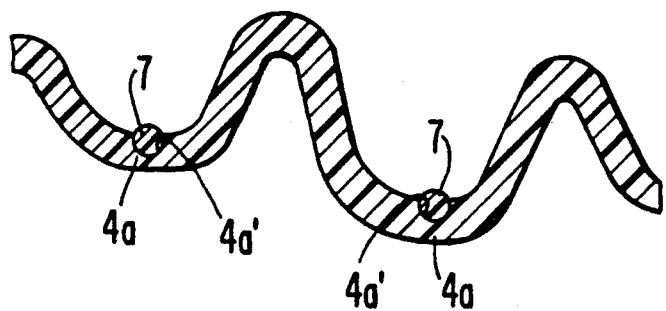
FIGS. 9 and 10 show alternations of the flexible boot of the invention.
Figure 10:
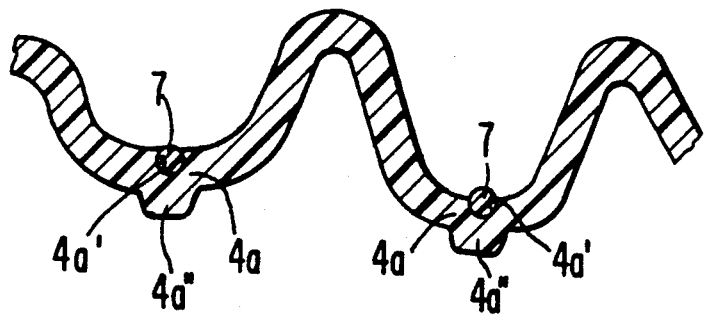
Figure 11:
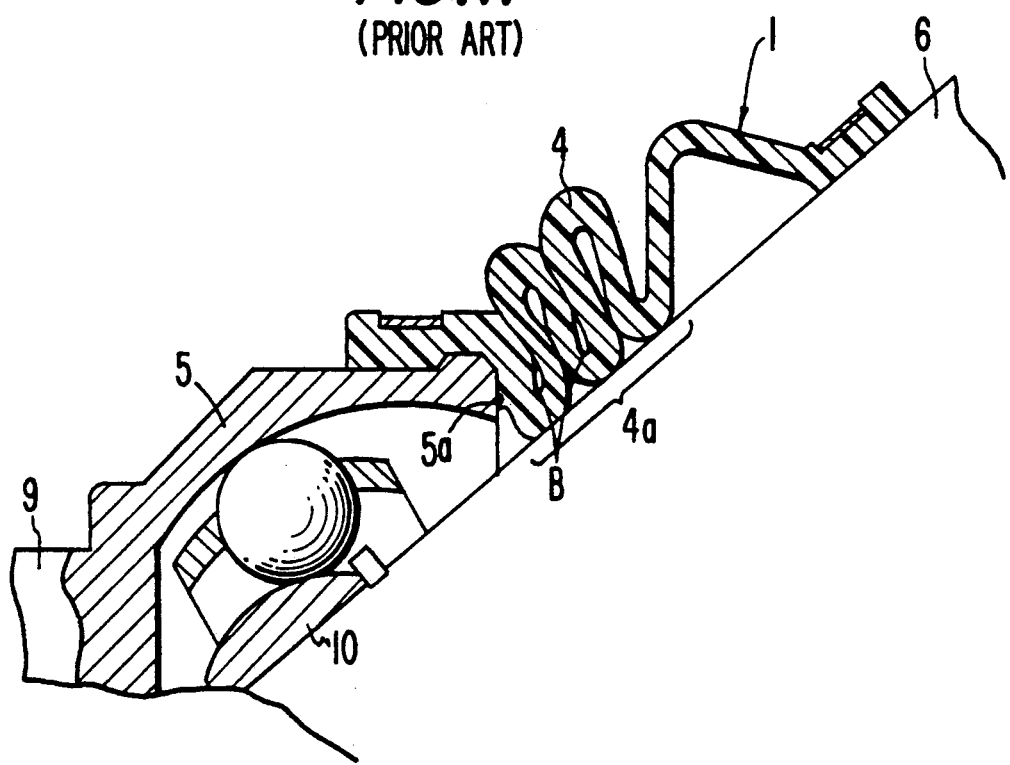
FIG. 11 is a partial sectional view of a conventional constant velocity joint.

Further, as shown in FIGS. 9 and 10, annular recesses $4a'$ may be formed in the outer peripheral surfaces of the valleys $4a$ and the elastic holder rings 7 may be fitted in the corresponding annular recesses $4a'$. With this arrangement, the elastic holder rings 7 can be protected from a flying pebble and prevented from being deviated from the corresponding valleys. In addition, in order to reinforce the valleys having the recesses $4a'$, annular projections $4a''$ (FIG. 10) may be provided on inner surfaces of the valleys.

According to the present invention, since the elastic holder ring is in close contact with the outer peripheral surface of the valley, the valley of the flexible boot can be prevented from acutely folding, whereby the service life of the flexible boot can be considerably increased even when the universal joint is operated at a large operating angle.

What is claimed is:

1. A flexible boot for universal joints including a joint body which has an inner ring fixed to one end of a first shaft and an outer ring provided on one end of a second shaft, wherein the boot comprises both ends fixed to said outer ring and to said first shaft, respectively, a bellows portion positioned between said both ends and having at least one alley, and at least one elastic holder ring closely contacted with an outer peripheral surface of said at least one valley, the rigidity to radial deformation of said elastic holder ring being smaller than the rigidity to radial deformation of said bellows portion, so as to prevent acute folding of said valley of the flexible boot.

2. A flexible boot according to claim 1, characterized in that an inner dimension of said elastic holder ring is equal to or smaller than an outer dimension of said valley.

3. A flexible boot according to claim 1, characterized in that a surface of the elastic holder ring, which is contacted with said outer peripheral surface of said valley, is constituted by a smoothly curved surface.

4. A flexible boot according to claim 1, wherein one of said at least one elastic holder ring is provided in a valley immediately adjacent to the outer ring.

5. A flexible boot for a universal joint comprising:
a bellows portion having a predetermined rigidity to radial deformation, said bellows portion having a plurality of alternating ridges and valleys; and
a means for preventing acute folding of said valleys of said flexible boot, said means including a plurality of elastic rings fitted within said plurality of valleys and having a rigidity to radial deformation smaller than said predetermined rigidity to radial deformation of said bellows portion.

* * * * *